United States Patent
Williamson et al.

(10) Patent No.: US 7,329,290 B2
(45) Date of Patent: Feb. 12, 2008

(54) FUEL REFORMING APPARATUS FOR PRODUCING A CARBON-MONOXIDE FREE REFORMED FUEL GAS COMPRISING HYDROGEN

(75) Inventors: Weldon S. Williamson, Malibu, CA (US); John J. Vajo, West Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 660 days.

(21) Appl. No.: 10/682,374

(22) Filed: Oct. 8, 2003

(65) Prior Publication Data
US 2004/0118046 A1 Jun. 24, 2004

Related U.S. Application Data (60) Provisional application No. 60/417,334, filed on Oct. 8, 2002, provisional application No. 60/417,333, filed on Oct. 8, 2002.

(51) Int. Cl.
*C01J 3/46* (2006.01)
*C01B 3/24* (2006.01)
*B01D 53/22* (2006.01)

(52) U.S. Cl. .......... 48/61; 204/164; 423/248; 48/197 R; 48/211; 48/213; 48/61

(58) Field of Classification Search .......... 48/127.9, 48/198.1, 198.3, 198.7, 197 FM; 422/186, 422/186.03; 423/655–656, 658.3, 248, 650
See application file for complete search history.

(56) References Cited

U.S. PATENT DOCUMENTS
| | | | |
|---|---|---|---|
| 5,855,855 A | 1/1999 | Williamson et al. | ... 422/186.04 |
| 6,245,309 B1 * | 6/2001 | Etievant et al. | ............. 423/248 |

FOREIGN PATENT DOCUMENTS
| | | |
|---|---|---|
| EP | 0 647 996 A1 | 4/1995 |
| EP | 1 193 218 A1 | 4/2002 |

(Continued)

OTHER PUBLICATIONS
Bromberg, L., et al., "Compact Plasmatron-Boosted Hydrogen Generation Technology For Vehicular Applications," *International Journal of Hydrogen Energy*, vol. 24, No. 4, pp. 341-350 (Apr. 1999).

Lerner, E., "Can Plasma Clean Auto Exhaust," *The Industrial Physicist*, pp. 14-17 (Apr. 2003).

(Continued)

*Primary Examiner*—Glenn A. Caldarola
*Assistant Examiner*—Kaity Handal
(74) *Attorney, Agent, or Firm*—Ladas & Parry (57) ABSTRACT

This invention relates to a fuel reforming apparatus for producing a carbon-monoxide free reformed fuel gas comprising hydrogen. More particularly, this invention relates to nonthermal plasma reactors for removing carbon monoxide from a reformed fuel gas produced from a fuel containing bonded atoms of hydrogen exiting a reformer. More particularly, this invention relates to nonthermal plasma reactors for reforming a fuel containing bonded atoms of hydrogen into a reformed fuel gas. This invention relates further to hydrogen-oxygen fuel cells, which comprise a fuel reformer for reforming a fuel into a reformed fuel gas comprising hydrogen, a carbon monoxide remover for removing carbon monoxide in the reformed fuel gas and supplying the reformed fuel gas to the fuel cell.

7 Claims, 4 Drawing Sheets

FOREIGN PATENT DOCUMENTS

| | | |
|---|---|---|
| FR | 2757499 A1 * | 6/1998 |
| GB | 2 324 196 A | 10/1998 |
| WO | 02/28771 A1 | 4/2002 |
| WO | 02/076884 A1 | 10/2002 |

OTHER PUBLICATIONS

Sobacchi, M.G., et al., "Experimental Assesment Of A Combined Plasma/Catalytic System For Hydrogen Production Via Partial Oxidation of Hydrocarbon Fuels," *International Journal of Hydrogen Energy*, vol. 27, No. 6, pp. 635-642 (Jun. 2002).

* cited by examiner

FUEL REFORMING APPARATUS FOR PRODUCING A CARBON-MONOXIDE FREE REFORMED FUEL GAS COMPRISING HYDROGEN

CLAIM OF BENEFIT OF PROVISIONAL APPLICATIONS

This application claims the benefit of U.S. Provisional application Ser. No. 60/417,333, filed on Oct. 8, 2002, which is incorporated herein by reference in its entirety. This application claims the benefit of U.S. Provisional application Ser. No. 60/417,334, filed on Oct. 8, 2002, which is incorporated herein in its entirety.

BACKGROUND OF THE INVENTION

This invention relates to a fuel reforming apparatus for producing a carbon-monoxide free reformed fuel gas comprising hydrogen. More particularly, this invention relates to nonthermal plasma reactors for removing carbon monoxide from a reformed fuel gas produced from a fuel containing bonded atoms of hydrogen exiting a reformer. More particularly, this invention relates to nonthermal plasma reactors for reforming a fuel containing bonded atoms of hydrogen into a reformed fuel gas. This invention relates further to hydrogen-oxygen fuel cells, which comprise a fuel reformer for reforming a fuel into a reformed fuel gas comprising hydrogen, a carbon monoxide remover for removing carbon monoxide in the reformed fuel gas and supplying the reformed fuel gas to the fuel cell.

Hydrogen-oxygen fuel cells commonly used in spacecraft are now finding new applications such as fuel cell-powered electric cars, generator replacements, and local micro-power generation.

One of the most important technological processes is the production of hydrogen via a reformation process involving the reaction of water with, preferably, methanol. Alternatively, instead of methanol, other appropriate organic substances may be chosen to be reacted with water. Examples of such alternative organic substances comprise volatile low-molecular weight hydrocarbons (such as methane, ethane, etc.), other low-molecular weight alcohols (such as ethanol, n- or iso-propanol, as well as aldehydes, ketones (such as acetone) and the like as well as natural gas and gasoline. In addition, ammonia can be used as well. Among other applications, this process is used, for instance, in the development of fuel cells where hydrogen so produced serves as fuel.

The reformation process of hydrocarbon fuel produces a fuel cell feed stream containing hydrogen, and also such principle by-products as carbon dioxide and water. The process also produces certain amounts of carbon monoxide, which is harmful.

In a conventional autothermal reformer a hydrocarbon fuel is injected into a heated chamber along with water vapor and air. In the heated chamber the fuel is vaporized, to ensure high efficiency operation.

The hydrocarbon fuel burns by reacting with a small amount of air to yield carbon monoxide and hydrogen, as can be shown in case of methane as reaction (1):

In addition, the hydrocarbon fuel reacts with the water vapor also releasing hydrogen and producing carbon monoxide, for example, in case of a methane fuel as reaction (2):

The air allows combustion of a small fraction of the hydrocarbon fuel, elevating the temperature of the reactor and providing power to sustain the endothermic reforming reaction. The combustion is rich, so nitrogen oxides are not generated.

Carbon monoxide generated as a result of reactions (1) and (2) has an effect of poisoning the fuel cell at levels as low as 10 parts per million (ppm). Carbon monoxide is, therefore, a harmful by-product, which should be removed. In order to remove carbon monoxide and also in order to produce additional hydrogen, additional water vapor reacts with carbon monoxide to produce additional hydrogen and releasing carbon dioxide as a waste product as reaction (3):

However, it does not remove all carbon monoxide. The concentration of carbon monoxide remains still too high even after the gas stream exits the reactor. The removal of the remainder of carbon monoxide is achieved by either of two thermal processes, therefore in a water-gas shift reactor (WGS), or in a preferential oxidation reactor (PROX). The stream of hydrogen contains some carbon monoxide released as a result of reactions (1) and (2) which is then directed to a preferential oxidation reactor. The oxidation of CO occurs with the reaction (4):

The oxygen in reaction (4) is provided by admitting air. Requirements of CO-conversion reactors are very stringent. In particular, they must reliably reduce the concentration of carbon monoxide in the gas stream exiting the reformer from about 10% to less than 50 ppm. Otherwise, the fuel cell stack will be poisoned, leaving the vehicle inoperable and an exhaust harmful to the environment will be generated besides.

Hydrogen fuel purged of carbon monoxide as discussed above is directed to a fuel cell where it combines with air to produce electricity, water vapor and heat, heat being recycled to maintain the Partial Oxidation reactor at a proper temperature. The whole system can be used to propel a vehicle with practically no emissions other than $CO_2$.

New applications are driven by the need to find alternatives to the internal combustion engine, and in the case of micro-power generation, the need to avoid building giant power-generating stations and high-voltage transmission lines. A key impediment to rapid adoption of fuel cells for these applications is the absence of an infrastructure for delivery of hydrogen, and of efficient, safe means to store it. Reformers answer this need by using an onboard chemical process to extract hydrogen from hydrogen-rich gases such as natural gas, methanol, gasoline, or ammonia.

The conventional autothermal reformers and CO-conversion reactors described above can be used to produce essentially CO-free hydrogen, they are however plagued by numerous problems and disadvantages. They are very complex, bulky, cumbersome and very expensive devices with long start-up latencies and short lifetimes. Especially for the automotive application (fuel cell powered vehicles), these characteristics are objectionable because they add bulk and weight to the car and require the driver to wait while the reactors come up to temperature before he can drive the vehicle. Therefor they require substantial warm-up time. In addition, their response to a change in the gas flow rate is too sluggish for automotive use. All these disadvantages are also typical even for systems not requiring the CO conversion reactors, systems using for example ammonia as a fuel and not producing carbon monoxide.

A second type of a conventional thermal-plasma reformer is also known, but this device has not found common application because of the huge input power, which is required. Most of the power input to the plasma ends up merely heating the gas, which is an inefficient use of electrical power.

"The Industrial Physicist, April 2000, page 14" discloses a thermal-plasma reactor which treats a small sidestream of gasoline vapor, and the resulting hydrogen-rich gas is added to the gasoline-air mixture being injected into the internal-combustion engine, thereby increasing its efficiency and reducing its pollution. Yet this system does not provide a zero-emission vehicle and is a mere modification of an internal combustion engine.

In view of the foregoing there are problems and disadvantages inherent in reformers and CO-conversion reactors. Such reformer and CO-converter should preferably be simple in design, lightweight, compact and inexpensive. It should be able to ensure efficient delivery of hydrogen-containing fuel to a fuel cell and to avoid formation of harmful carbon monoxide. It should be able to be started instantaneously and to respond to the change in the gas flow rate immediately.

There exists no known prior art describing a reformer and CO-converter having all the advantages and benefits described above. Yet the need for such is acute.

SUMMARY OF THE INVENTION

This invention satisfies the above needs. A novel fuel reforming apparatus comprising one or more nonthermal plasma reactors is provided for producing a carbon-monoxide free reformed fuel gas comprising hydrogen.

According to one preferred aspect of this invention, a converter for converting carbon monoxide present in a reformed fuel gas is described wherein the converter comprises a nonthermal plasma reactor.

According to another preferred aspect of the present invention, a reformer for producing carbon monoxide-free reformed fuel gas comprising hydrogen is described wherein the reformer comprises a nonthermal plasma reactor.

BRIEF DESCRIPTION OF THE DRAWINGS

These and other features and advantages of this invention will become better understood with regard to the following description, appended claims, and accompanying drawings where

DETAILED DESCRIPTION OF THE INVENTION

This invention is directed to a novel fuel reforming apparatus comprising one or more nonthermal plasma reactors provided for producing a carbon-monoxide free reformed fuel gas comprising hydrogen.

Figure 3:
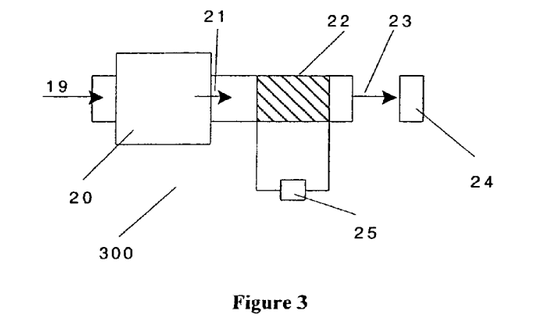
FIG. 3 is a schematic diagram showing a preferred embodiment of an assembly including a nonthermal plasma CO-converter in accordance with the present invention.
Figure 4:
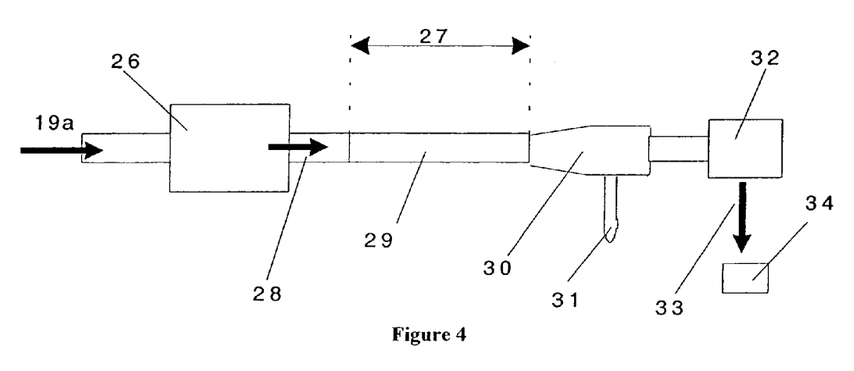
FIG. 4 is a schematic diagram showing an alternative embodiment of an assembly including a nonthermal plasma CO-converter in accordance with the present invention.

This invention is directed to a nonthermal plasma reactor for converting carbon monoxide present in a reforming apparatus. With reference to the drawings and particularly FIG. 3 and FIG. 4 a reforming apparatus is shown comprising a partial oxidation reactor and a nonthermal plasma reactor for converting carbon monoxide for producing a carbon-monoxide free reformed fuel gas comprising hydrogen. Therefore the nonthermal plasma reactor replaces a thermal CO-conversion reactor.

In order to achieve the beneficial results the nonthermal-plasma technology is provided in this invention, in order to convert carbon monoxide and to supply a fuel cell with hydrogen-rich fuel, which is essentially carbon monoxide free.

Figure 5:
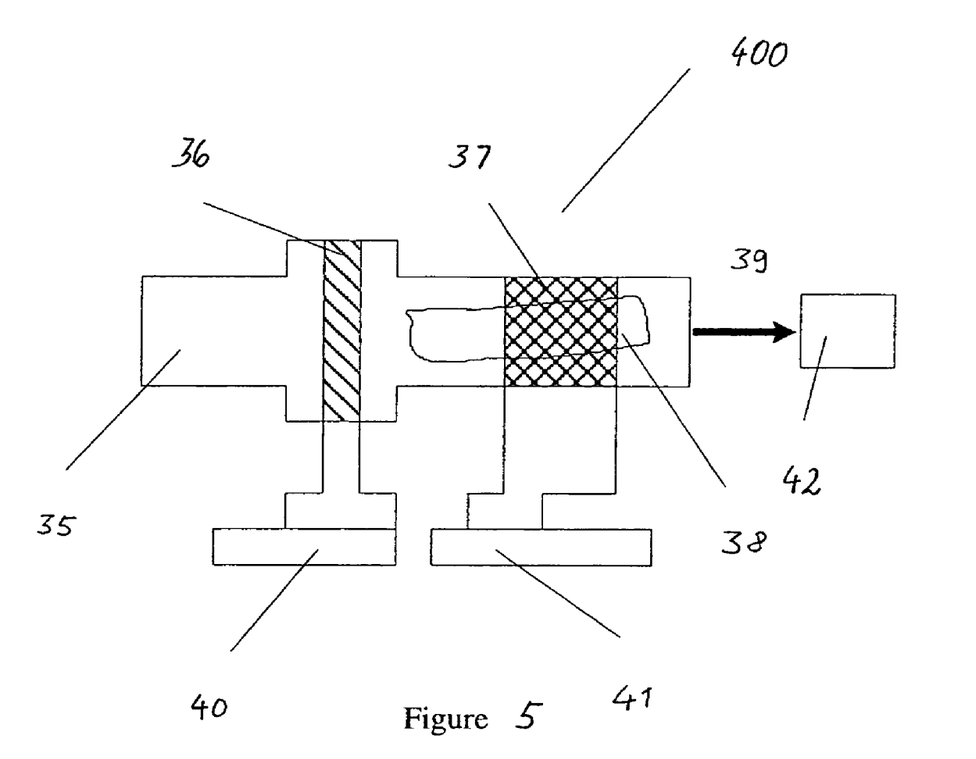
FIG. 5 is a schematic diagram showing a preferred embodiment of a nonthermal plasma reformer in accordance with the present invention.

This invention is further directed to a nonthermal plasma reactor for producing carbon monoxide-free reformed fuel gas comprising hydrogen. With reference to the drawings and particularly FIG. 5 a reforming apparatus is shown comprising a nonthermal plasma reactor for producing carbon monoxide-free reformed fuel gas comprising hydrogen. Therefore the nonthermal plasma reactor replaces an autothermal reformer and if hydrocarbon fuels are used the nonthermal plasma reactor replaces the thermal CO-conversion reactor as well. Ammonia as a fuel does not produce carbon monoxide.

This invention provides a nonthermal plasma reactor, which performs the reforming and CO conversion functions in the same device and requires only a few seconds to warm-up. It is also much smaller than its thermal counterparts.

The benefit of nonthermal plasma is that most of the electrons in this plasma are in an energy range that corresponds to the peak of the cross-sections of typical dissociation and ionization processes, and only few electrons are in the below about 3 electron-Volts range in which electron energy is predominantly converted to waste heat. The key element of nonthermal-plasma generation is to repetitively form a plasma by some means and then terminate the discharge within a few tens of nanoseconds. This duration is short enough (at atmospheric pressure) that electrons in the discharge do not thermalize and most of the electrons have energies in the range of between about 10 to about 100 electron-Volts. Thermal plasmas, by contrast, have a much more widely distributed energy range. At atmospheric pressure the electrons' temperature is commonly below 1 electron Volt, thus having only few desired electrons with energy between 10 and 100 electron Volts. Generation of thermal plasma at atmospheric pressure having electron temperature much above 1 electron Volt requires a reasonably large power input because of the losses due to heat flow.

Figure 1:
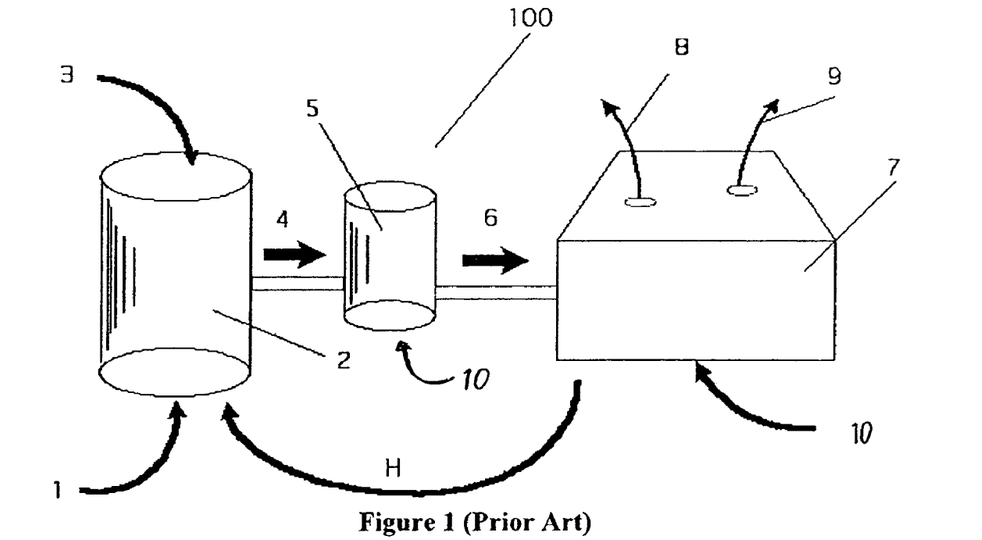
FIG. 1 is a schematic diagram showing a prior art fuel cell powered by hydrogen from an autothermal reformer.
Figure 1A:
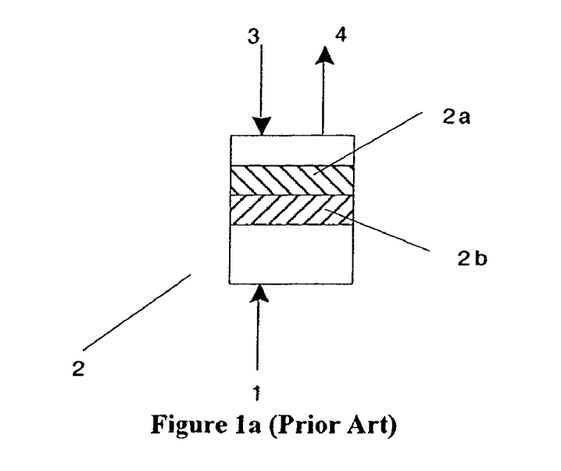
FIG. 1a is a schematic diagram showing a partial oxidation (POX) reactor of FIG. 1 as an example of a autothermal reformer in more detail.

FIG. 1 shows the arrangement of a hydrogen-oxygen fuel cell supplied by a conventional autothermal reformer 100 according to the state of the art. The operation of this system is described as follows. Liquid hydrocarbon fuel 1 is injected into a heated chamber of a Partial Oxidation (POX) reactor 2, along with water vapor and air, supplied via a stream 3. In the heated chamber of the POX reactor 2 the fuel 1 is vaporized, preferably using waste heat energy from a fuel cell 7, to ensure high efficiency operation. This waste heat energy is shown as stream H. The hydrocarbon fuel 1 then burns in the POX reactor 2 by reacting with a small amount of air supplied from stream 3 to yield carbon monoxide and hydrogen. In addition, the hydrocarbon fuel 1 reacts with the water vapor also supplied via stream 3. The air allows combustion of a small fraction of the hydrocarbon fuel 1, elevating the temperature of the POX reactor 2 and providing power. In order to remove carbon monoxide and also to produce additional hydrogen, additional water vapor reacts with carbon monoxide in a catalytic reaction caused by catalysts 2a and 2b in POX reactor 2 (FIG. 1a) releasing carbon dioxide as a waste product. The removal of the remainder of carbon monoxide is achieved by either of two thermal processes in a thermal CO-conversion reactor, therefore in a water-gas shift reactor (WGS reactor), or in a preferential oxidation reactor (PROX). The latter choice is shown on FIG. 1. The stream of hydrogen 4 generated in the POX reactor 2 and containing some carbon monoxide is directed to a PROX reactor 5, where carbon monoxide is preferentially oxidized (burnt) over a bed of a catalyst to a concentration of less than 10 ppm. The oxygen is provided by admitting air via the stream 10 in FIG. 1. Hydrogen-containing fuel 6 purged of carbon monoxide, as discussed above, is directed to a fuel cell 7 where it combines with air 10 to produce electricity 8, water vapor 9 and heat H, heat being recycled to maintain the POX reactor 2 at a proper temperature. The whole system can be used to propel a vehicle with practically no emissions other than $CO_2$.

Figure 2:
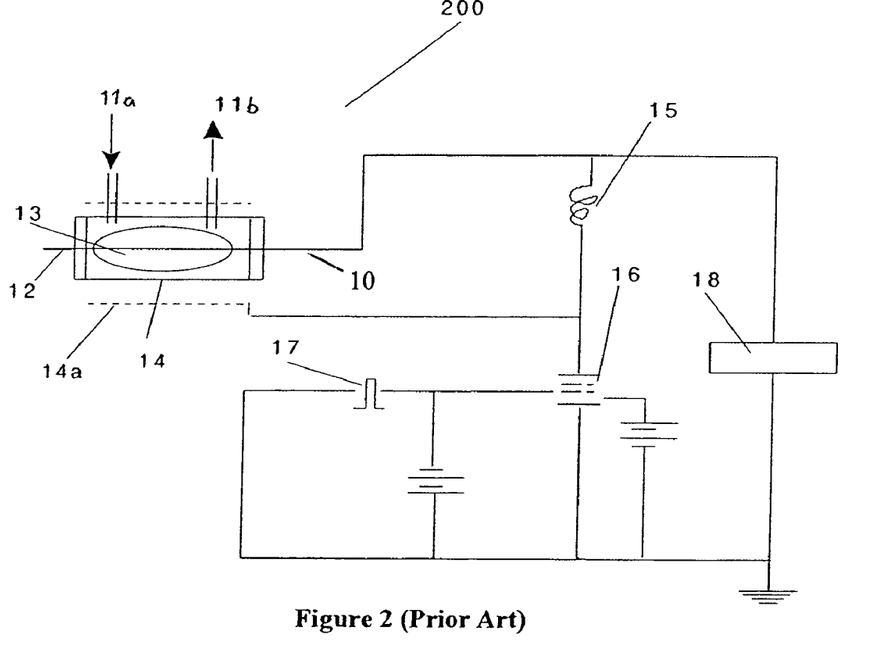
FIG. 2 is a schematic diagram showing a nonthermal plasma reactor known in prior art.

The above-mentioned nonthermal plasma reactor, 200, is schematically shown in FIG. 2. It comprises a corona discharge chamber 13 formed from a hollow dielectric cylinder 14 with a wire mesh or solid axial electrode which may be a solid metal tube, or thin electroplated or evaporated coating, and a conducting axial wire electrode 12 extending axially through the inside of the corona discharge chamber 13. The dielectric used for the wall of the corona discharge chamber 13 is preferably a low loss tangent material, such as a ceramic or glass. The axial electrode 12 has a diameter that is small enough, preferably about 50 micrometers, to produce electric fields at its surface high enough to permit corona emission. The reactor 200 also includes an inlet conduit 11a through which polluted gas is emitted into the interior of the cylinder, and an outlet conduit 11b through which the gas exits after having had its pollutants remedied by a corona discharge treatment. The reactor cell forms a capacitor across which an energy recovering inductor 15 is connected to establish an LC resonant circuit; the opposite ends of inductor 15 are connected respectively to the inner and outer reactor electrodes 12 and 14a. The resonant circuit is energized by a simple high-voltage pulser which is shown as a high voltage (preferably about 15 kV, DC) power supply 18 connected in series with the resonant circuit and a switch 16, which may be implemented preferably by a vacuum electrode or by other means known to those skilled in the art. A control element, illustrated as pulse generator 17, applies time-spaced pulses to close the switch 16, with the switch remaining open between successive pulses. With each pulse current flows into the capacitance of the reactor, charging it to the power supply's voltage level and initiating a corona discharge pulse within the corona discharge chamber 13.

In the reactor 200, pulses of high voltage are applied to electrodes 12 and 14a and generate plasma by corona emission. The process of generating these pulses is as follows. The resonant circuit has a radio resonant frequency, with the switch 16 closed to supply an energizing pulse during a portion of one half-cycle of the resonant period. During the next half-cycle of the LC resonant period (which is equal to $0.5\pi(LC)0.5$), the switch is open and current flows out of the reactor capacitance and into the inductor 15. Another half-period later the current flows back into the reactor capacitance, initiating another corona discharge pulse with no additional energy being drawn from the power supply 18, since the switch 16 remains open. This oscillation, in which a corona discharge is produced during every other half-period, continues until the voltage decays below the threshold for initiating a discharge.

Another pulse is then provided from the power supply 18 to reactivate the self-oscillation process. The entire energy of the power supply pulse (except for very small circuit losses) is thus utilized in the corona discharge chamber 13. The energy is cycled back and forth between the corona discharge chamber 13 and the inductor 15 until corona action ceases, and the residual energy still remains in the circuit when the next energizing pulse is presented to boost it back to corona-producing levels. The resonant circuit's natural frequency is preferably on the order of about 1 MHZ, with the effective charging time during which the reactor capacitance is charged up typically extending for only about 10-20 nanoseconds; the corona discharge lasts only for this charging period. A natural frequency of about 1 MHZ is suitable for treating gaseous flow rates on the order of 100 $cm^3$ per minute (with a corona discharge chamber about one-quarter meter long). A higher frequency would generally be desirable for higher gaseous flow rates. The system's natural frequency can be increased by making the walls of the corona discharge chamber 13 thicker and thereby reducing its capacitance, making the inductor 15 smaller, or both. The reactor 200 has been shown to be highly effective in both oxidizing hydrocarbons and carbon monoxide and reducing various nitrous oxides $NO_x$ in polluted gas streams directed through the inlet conduit 10. In this invention this reactor is used for the process of conversion of carbon monoxide mentioned above.

FIG. 3 illustrates a preferred embodiment of the assembly of this invention, including a reformer and a nonthermal plasma converter of carbon monoxide. In the example shown on FIG. 3, the reformer of this invention is operating with a particular fuel having bonded atoms of hydrogen, e.g., methyl alcohol (methanol), and water. Methanol is a preferred hydrocarbon-based fuel, but other fuels can also be used, such as, for instance, volatile hydrocarbons, low molecular weight aldehydes or ketones as well as ammonia. The nonthermal plasma converter of carbon monoxide is operating in conjunction with the reformer.

In the device 300 depicted in FIG. 3, a liquid solution 19 of methanol in water (with water being supplied in excess) is supplied to a reformer 20. The ratio of methanol to water in the solution is preferably within a range of between about 1:1 to about 1:2 by weight. Any kind of reformer can be used, according to a chosen design, including a typical autothermal reformer 100 shown on FIG. 1. However, such autothermal reformer would contain no PROX reactor 5 because conversion of carbon monoxide in the preferred embodiment of this invention is achieved in a different way, by using a nonthermal plasma reactor as explained below.

In the reformer 20, water and methanol react, and a mixture 21 comprising hydrogen gas, carbon dioxide, and excess water vapor exits the reformer 20. In addition, the reforming in a typical reformer also normally generates carbon monoxide as a part of mixture 21. The mixture 21 can contain as much as 10% of carbon monoxide most of which has to be removed (so as no more than about 50 ppm of carbon monoxide remain).

This process of elimination of carbon monoxide in the mixture 21 is achieved in a nonthermal plasma CO-conversion reactor like the reactor 200 (shown in FIG. 3 as numeral 22) positioned just downstream of the reformer 20. Water vapor and carbon monoxide from mixture 21 are dissociated and weakly ionized when treated by the corona discharge nonthermal plasma CO-conversion reactor 22. The reactor 22 is powered by a corona power supply 25. As a result, carbon monoxide is eliminated by being oxidized to carbon dioxide to produce additional hydrogen gas, according to reaction (3):

$$CO + H_2O \longrightarrow H_2 + CO_2 \qquad (3)$$

In this way, the $H_2$-containing, carbon monoxide free gas stream 23 is produced to be supplied to the fuel-cell stack 24. In fact, the stream 23 contains only hydrogen gas, harmless carbon dioxide, nitrogen and water vapor. In fuel-cell stack 24 hydrogen combines with air in the usual manner to produce electricity and water vapor. In the heated chamber of the reformer the fuel is vaporized, preferably using waste heat energy from fuel-cell stack 24, to ensure high efficiency operation. This waste heat energy is not shown.

An alternative embodiment of the assembly of this invention is shown on FIG. 4. Here, a mixture 19a of hydrocarbon fuel including methanol and other alcohols, water and air is fed to a reformer 26. Any suitable thermal reformer can be used including an autothermal reformer described above and shown on FIG. 3. Again, the autothermal reformer would contain no PROX reactor 5 because, as explained above, conversion of carbon monoxide is achieved in a different way, by using nonthermal plasma. The reformed gas stream 28 containing carbon monoxide is then directed to a microwave-powered nonthermal plasma reactor 27 (having a reactor cavity 29, a rectangular waveguide 30 and a magnetron 31) where carbon monoxide from the feed 28 is converted into carbon dioxide and the stream of fuel 33 fed into the fuel cell 34 is carbon-monoxide free. The plasma reactor 27 in this embodiment preferably has dimensions of about 100 by 50 by 250 millimeters and requires power not exceeding 270 Watts. It is to be used during periods when the demand for power from the fuel cell 34 is increased, e.g., during start-up or acceleration of a car. Otherwise, a standard water gas shift reactor 32 can be used, thus increasing the overall efficiency of the car because the water-gas shift reactor 32 is powered by waste heat.

FIG. 5 illustrates a preferred embodiment of the nonthermal plasma reformer of this invention. In the example shown in FIG. 5, the nonthermal plasma reformer of this invention is operating with a particular hydrocarbon-based fuel, methyl alcohol (methanol), and water. Methanol is a preferred hydrocarbon-based fuel, but other fuels can also be used, such as, for instance, volatile hydrocarbons, low molecular weight aldehydes, ketones and the like substances, as well as ammonia. In the device 400 depicted on FIG. 5, a solution of methanol in water (with excess water), from a tank 35, is supplied to a heated porous-ceramic disk 36 that serves as a vaporizer and phase separator. The ratio of methanol to water in the solution is preferably within a range of between about 1:1 to about 1:2 by weight. The vaporizer is powered by a power supply unit 40 and the preferred temperature of the heated disk 36 is within a range of between about 20° C. and about 300° C. The thinness of the disk allows it to be heated and to cool quickly so the vapor flow rate can be rapidly adjusted to meet the changing demands of the fuel-cell stack. The thickness of the disk is chosen according to the design and the criteria for such choice and other geometries, such as non-planar surfaces like spherical caps or folded surfaces as being known in the art.

Water and methanol vapors leaving the vaporizer 36 enter a nonthermal plasma reactor 37, powered by corona power supply 41. In the nonthermal plasma reactor 37 water and methanol vapors are dissociated and weakly ionized when treated by the corona discharge 38. This allows for the $H_2$-containing gas stream 39 ($H_2+CO_2+H_2O$) to be supplied to the fuel-cell stack 42 with no further processing, greatly simplifying the reforming process. In fuel-cell stack 42 hydrogen combines with air in the usual manner to produce electricity and water vapor.

The reforming process in the nonthermal plasma reactor 37 proceeds as follows. Under standard conditions at about 298° K (25° C.) the reforming reaction $$CH_3OH + H_2O \longrightarrow 3H_2 + CO_2 \qquad (5)$$

is known to be an endothermic reaction with an enthalpy change of about 0.51 eV. However, the change in entropy in reaction (5) is also positive, being about 1.9 meV/K. It is obvious, therefore, that at sufficiently high temperature the equilibrium shifts to favor the products $H_2+CO_2$.

As seen above, the reaction yields no harmful carbon monoxide, which beneficially distinguishes this process from the processes described above, i.e., the autothermal reforming that normally generates carbon monoxide, which has to be eliminated by using a CO-conversion reactor. Obviously, there is no need to use such CO-conversion reactor in a process of this invention shown in the reaction above.

The situation is similar for the reaction or decomposing of ammonia:

$$2NH_3 \longrightarrow N_2 + 3H_2 \qquad (6)$$

Decomposition of $NH_3$ is also an endothermic reaction with an enthalpy change of about 0.48 eV and an entropy change of about 1 meV/K. Therefore at temperatures in excess of about 1,000° K, the equilibrium greatly favors the decomposition products. Of course, no carbon monoxide is generated in reaction (6), so the use of a CO-conversion reactor is also unnecessary. Ammonia, therefore, is an alternative fuel that can be used.

Although nonthermal, the high electron energies in the corona discharge process described above yield products similar to those from a high temperature reaction that is quenched (cooled) extremely quickly. The extreme cooling rate locks in the products that would be in equilibrium at high temperatures. Large energy transfer to the electrons occurs quickly, inducing the desired chemical transformations, while energy transfer into motion of the atomic nuclei is much slower. Thus the desired reactions can occur without excessive, waste heating.

The energy needed for the endothermic reactions in a nonthermal plasma system comes from the fuel cell. As a result, the useful energy of the $CH_3OH+H_2O$ or $NH_3$ fuels is reduced by about 20%. However, the hydrogen content of these fuels is high, amounting to about 12% by weight for methanol and to about 17% by weight for ammonia. Therefore, reducing the useful energy by about 20% is fully compensated by the high hydrogen content of these fuels resulting in fuels still yielding high useful hydrogen contents.

A nonthermal-plasma-based reformer is suggested for example in applications in areas such as an emergency generator replacement because of rapid starting or in space replacing liquid hydrogen fuel with ammonia.

Having described the invention in connection with several embodiments thereof, modification will now suggest itself to those skilled in the art. As such, the invention is not to be limited to the described embodiments except as required by the appended claims.

What is claimed is:

1. A method for producing carbon monoxide-free reformed fuel gas consisting essentially of reacting a fuel gas using nonthermal plasma in at least one nonthermal plasma reactor.

2. The method as claimed in claim 1, wherein said reacting a fuel gas using nonthermal plasma comprises using nonthermal plasma to convert carbon monoxide from a reformed fuel gas in said nonthermal plasma reactor.

3. The method as claimed in claim 1, wherein said reacting a fuel gas using nonthermal plasma comprises, using nonthermal plasma to reform a fuel gas and to convert carbon monoxide from said reformed fuel gas in said nonthermal plasma reactor.

4. The method for producing a carbon monoxide-free hydrogen gas from a fuel according to claim 3, wherein said reacting a fuel gas using nonthermal plasma further comprises evaporating a fuel to produce the fuel gas that is reformed and converted in said nonthermal plasma reactor.

5. The method as claimed in claim 1 wherein a reformed fuel gas is produced by reforming a fuel comprising a substance having bonded atoms of hydrogen.

6. The method as claimed in claim 5 wherein said substance comprises methanol.

7. A method for producing carbon monoxide-free reformed fuel gas comprising producing a gas stream to be supplied to a fuel cell with no further processing by using nonthermal plasma to convert carbon monoxide from a reformed fuel gas in a nonthermal plasma reactor.

* * * * *